United States Patent
Bocklet et al.

(10) Patent No.: US 9,792,907 B2
(45) Date of Patent: Oct. 17, 2017

(54) LOW RESOURCE KEY PHRASE DETECTION FOR WAKE ON VOICE

(71) Applicant: Intel IP Corporation, Santa Clara, CA (US)

(72) Inventors: Tobias Bocklet, Munich (DE); Joachim Hofer, Munich (DE)

(73) Assignee: Intel IP Corporation, Santa Clara, CA (US)

(*) Notice: Subject to any disclaimer, the term of this patent is extended or adjusted under 35 U.S.C. 154(b) by 0 days.

(21) Appl. No.: 14/950,670

(22) Filed: Nov. 24, 2015

(65) Prior Publication Data

US 2017/0148444 A1  May 25, 2017

(51) Int. Cl.

| | |
|---|---|
| *G10L 15/00* | (2013.01) |
| *G10L 15/22* | (2006.01) |
| *G10L 17/22* | (2013.01) |
| *G10L 15/01* | (2013.01) |
| *G06F 17/27* | (2006.01) |
| *G10L 15/14* | (2006.01) |
| *G10L 15/02* | (2006.01) |

(52) U.S. Cl.
CPC ............ *G10L 15/22* (2013.01); *G06F 17/277* (2013.01); *G10L 15/01* (2013.01); *G10L 15/14* (2013.01); *G10L 17/22* (2013.01); *G10L 2015/025* (2013.01)

(58) Field of Classification Search
CPC ...................................................... G10L 15/22
USPC ........................................ 704/251, 254, 275
See application file for complete search history.

(56) References Cited

U.S. PATENT DOCUMENTS

| | | |
|---|---|---|
| 6,138,095 A | 10/2000 | Gupta et al. |
| 6,205,424 B1 | 3/2001 | Goldenthal et al. |
| 9,070,367 B1 | 6/2015 | Hoffmeister |
| 9,368,105 B1* | 6/2016 | Freed .................. G10L 15/22 |
| 9,401,140 B1* | 7/2016 | Weber .................. G10L 15/00 |
| 2002/0087314 A1* | 7/2002 | Fischer ................. G10L 15/07 704/255 |
| 2010/0198598 A1 | 8/2010 | Herbig et al. |
| 2012/0245934 A1 | 9/2012 | Talwar et al. |
| 2013/0289994 A1* | 10/2013 | Newman ............... G10L 15/22 704/254 |
| 2014/0129224 A1* | 5/2014 | Chien .................. G10L 15/142 704/249 |

(Continued)

OTHER PUBLICATIONS

Chen et al., "Small-Footprint Keyword Spotting Using Deep Neural Networks"; 2014 IEEE International Conference on Acoustics, Speech and Signal Processing (ICASSP), May 4-9, 2014, pp. 4087-4091.

(Continued)

*Primary Examiner* — Shaun Roberts
(74) *Attorney, Agent, or Firm* — Green, Howard, & Mughal LLP.

(57) ABSTRACT

Techniques related to key phrase detection for applications such as wake on voice are discussed. Such techniques may include updating a start state based rejection model and a key phrase model based on scores of sub-phonetic units from an acoustic model to generate a rejection likelihood score and a key phrase likelihood score and determining whether received audio input is associated with a predetermined key phrase based on the rejection likelihood score and the key phrase likelihood score.

23 Claims, 7 Drawing Sheets

(56) References Cited

U.S. PATENT DOCUMENTS

| | | | |
|---|---|---|---|
| 2014/0136200 A1* | 5/2014 | Winter | G10L 15/07 704/244 |
| 2014/0200890 A1 | 7/2014 | Kurniawati et al. | |
| 2014/0278435 A1* | 9/2014 | Ganong, III | G10L 15/22 704/275 |
| 2015/0025890 A1 | 1/2015 | Jagatheesan et al. | |
| 2015/0066495 A1* | 3/2015 | Zhang | G10L 15/02 704/231 |
| 2015/0073795 A1 | 3/2015 | Tan | |
| 2015/0095027 A1 | 4/2015 | Parada San Martin et al. | |
| 2015/0154953 A1 | 6/2015 | Bapat et al. | |
| 2015/0340032 A1 | 11/2015 | Gruenstein | |
| 2016/0066113 A1* | 3/2016 | Elkhatib | H04R 29/004 381/56 |
| 2016/0189706 A1* | 6/2016 | Zopf | G10L 15/063 713/320 |

OTHER PUBLICATIONS

Rose et al., "A Hidden Markov Model Based Keyword Recognition System"; 1990. ICASSP-90., vol. 1, 1990 International Conference on Acoustics, Speech, and Signal Processing, Apr. 3-6, 1990, pp. 129-132.

Zhang et al., "Unsupervised Spoken Keyword Spotting via Segmental DTW on Gaussian Posteriorgrams" In Proc. of Automatic Speech Recognition & Understanding Workshop (ASRU 2009), IEEE, 2009, Merano, Dec. 2009, pp. 398-403.

International Search Report and Written Opinion for International Patent Application No. PCT/US2016/049909, mailed on Dec. 22, 2016.

International Search Report & Written Opinion dated Apr. 28, 2017 for PCT Patent Application No. PCT/US17/14435.

Non-Final Office Action dated Jun. 5, 2017 for U.S. Appl. No. 15/057,695.

\* cited by examiner

LOW RESOURCE KEY PHRASE DETECTION FOR WAKE ON VOICE

BACKGROUND

Key phrase or hot word detection systems may be used to detect a word or phrase or the like, which may initiate an activity by a device. For example, the device may wake (e.g., transition from a low power or sleep mode to an active mode) based on the detection of a particular word or phrase.

Current key phrase detection systems may model context-dependent phones of key phrases and may use Gaussian mixture models (GMMs) to model the acoustics of the variations. Such systems may include a model for the key phrase and a model for non-key phrases. However, such models are too complex for implementation in low resource (e.g., compute resource, memory resource, and power resource) environments. Simpler techniques that use less resources such as less power may be used in such low resource environments. However current low resource techniques have problems with robustness (e.g., noise, false accepts, and the like).

As such, existing techniques do not provide high quality low resource key phrase detection. Such problems may become critical as the desire to implement key phrase detection systems such as wake on voice systems becomes more widespread.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION

Figure 1:
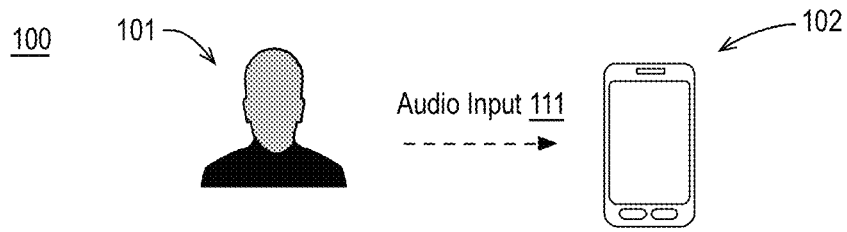
FIG. 1 is an illustrative diagram of an example setting for providing key phrase detection.

One or more embodiments or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips (e.g., including digital signal processors, dedicated hardware, or the like) and/or packages, and/or various computing devices and/or consumer electronic (CE) devices such as set top boxes, smart phones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

References in the specification to "one implementation", "an implementation", "an example implementation", etc., indicate that the implementation described may include a particular feature, structure, or characteristic, but every embodiment may not necessarily include the particular feature, structure, or characteristic. Moreover, such phrases are not necessarily referring to the same implementation. Further, when a particular feature, structure, or characteristic is described in connection with an embodiment, it is submitted that it is within the knowledge of one skilled in the art to effect such feature, structure, or characteristic in connection with other implementations whether or not explicitly described herein.

Methods, devices, apparatuses, computing platforms, and articles are described herein related to low resource key phrase detection for applications such as wake on voice.

As described above, key phrase or hot word detection systems may be used to detect a word or phrase or the like, which may initiate an activity by a device such as waking the device from a low power or sleep mode to an active mode based on detection of the key phrase. As used herein, the term key phrase may indicate any audio indicator or acoustic event to be detected such as a phrase, a word, or a group of phones, or an audio or acoustic event such as a baby's cry, a scream, or the like. Furthermore, the key phrase may be predetermined for use by the system such that detection of a predetermined key phrase may be provided. In an embodiment, an energy based voice activation detection may detect speech or some form of audio input and key phrase detection as discussed herein may be initiated based on the voice activation detection.

In some embodiments, a time series of scores of sub-phonetic units may be generated based on a time series of feature vectors representative of received audio input that may include input speech. For example, audio input that may include an input speech stream may be received via a microphone and the resultant audio data may be sampled over time to generate extracted coefficients such as Mel frequency cepstrum coefficients (MFCCs) or the like. Multiple sets of MFCCs (e.g., attained over time) may be stacked to form a feature vector such as a multi-dimensional feature vector. Furthermore, such feature vectors may be generated over time to provide a time series of feature vectors representative of the received audio that may include speech. Such feature vectors may be scored based on an acoustic model such as a deep neural network (DNN) or the like to provide the scores of the sub-phonetic units. For example, at least some of the sub-phonetic scores may be associated with a likelihood a particular triphone has been spoken.

Based on the scores of sub-phonetic units (e.g., the outputs of the acoustic model), a start state based rejection model and a key phrase model associated with a predetermined key phrase may be updated. For example, the start state based rejection model and the key phrase model may be updated at each time instance of an output from the acoustic model. The start state based rejection model may include, for example, a single state having self loops associated with some of the scores of sub-phonetic units of the acoustic model. Such self loops may include updates to the single state based on outputs from the acoustic model without any transitions from other states of the model. Furthermore, the key phrase model may include a multi-state lexicon look up key phrase model having transitions between the states that are associated with the lexicon look up for the predetermined key phrase.

Based on the updates to the start state based rejection model and the key phrase model, a determination may be made as to whether the received input speech is associated with the predetermined key phrase. For example, the single state of the start state based rejection model may provide a rejection likelihood score (e.g., a likelihood the received speech is not the key phrase) and the final state of the key phrase model provide a key phrase likelihood score (e.g., a likelihood the received speech is the key phrase) for the received audio input. The determination as to whether the received audio input is associated with the predetermined key phrase may be determined based on the rejection likelihood score and the key phrase likelihood score. For example, a likelihood score (e.g., a log likelihood ratio) based on the rejection likelihood score and the key phrase likelihood score may be determined and compared to a predetermined threshold. For example, if the log likelihood score is greater than the threshold, the device may be activated or woken from a sleep mode or the like.

Furthermore, in some embodiments discussed herein, the acoustic model (e.g., a pruned acoustic model), the start state based rejection model, and the key phrase model may be generated by training an acoustic model using a training set of audio such that the acoustic model has multiple outputs representative of tied triphone (e.g., HMM-) states. For example, each of the tied triphone states may be associated with one of multiple monophones. Furthermore, the acoustic model may include outputs representative of non-speech such as silence or background noise. In an embodiment, an acoustic model (e.g., a DNN) may be trained. Based on the acoustic model outputs (e.g., DNN-outputs), the triphones where each possible phone is a center phone may be selected. The acoustic model outputs corresponding to the center phone that has been observed the most often during training may be selected and such selected acoustic model outputs may be used as or in the rejection model. For example, the N most important center-phone acoustic model outputs may be selected for the rejection model. In some embodiments, acoustic model outputs associated with silence or background noise may also be added to the rejection model. Then, a sequence of acoustic model outputs for the key phrase model may be generated. For example, such a sequence may be generated by a lexicon look up. Given a key phrase such as "Hello Machine" or the like, based on a lexicon look up, the acoustic model outputs needed to form the sequence may be determined and such acoustic model outputs may be put together to form the recognition sequence.

Based on the subset of acoustic model outputs selected for use in the rejection model and the subset of acoustic model outputs used for the key phrase model, the original acoustic model may be pruned such that other acoustic model outputs are discarded. The pruned acoustic model may be implemented (e.g., scored) for key phrase detection as discussed herein. Such pruning may provide for a substantially smaller acoustic model for implementation, which may save on resources (e.g., power, computational, memory, or the like). Such modeling may provide for the generation of models associated with any combinations of silence, sound, speech, and key phrase during the training and pruning process. Therefore, such modeling and its implementation may provide for flexibility and low resource key phrase detection. For example, such techniques may provide low error rates in different noise/signal-to-noise ratio (SNR) environments while providing low memory requirements (e.g., less than about 30 kB including voice activation detection) and low computational requirements (e.g., less than about 15 MCPs including voice activation detection).

FIG. 1 is an illustrative diagram of an example setting 100 for providing key phrase detection, arranged in accordance with at least some implementations of the present disclosure. As shown in FIG. 1, setting 100 may include a user 101 providing audio input 111 to a device 102. For example, device 102 may be in a deep sleep or power saving mode or the like and user 101 may be attempting to wake device 102 via key phrase detection. If user 101 provides audio input 111 that is identified as the key phrase of device 102, device 102 may wake from a sleep or power saving mode or the like. For example, device 102 may provide an automatic wake on voice capability for user 101. As shown, in some examples, an automatic wake on voice system may be implemented via device 102 such that device 102 may be a smartphone. However, device 102 may be any suitable device such as a computer, a laptop, an ultrabook, a smartphone, a tablet, a phablet, a wearable device such as a smart watch or eye glasses, or the like. In any case, device 102 may be described as a computing device as used herein.

As shown, in some examples, user 101 may provide audio input 111 in an attempt to wake device 102 or the like. As will be appreciated, device 102 may also receive as audio input background noise, silence, background speech, speech not intended to attain access to device 102, and the like. For example, device 102 may need to differentiate or classify audio (e.g., audio input 111 or other audio) that does not match a predetermined key phrase (e.g., as provided by a rejection model as discussed herein) from audio that matches the predetermined key phrase (e.g., as provided by a key phrase model as discussed herein).

Figure 2:
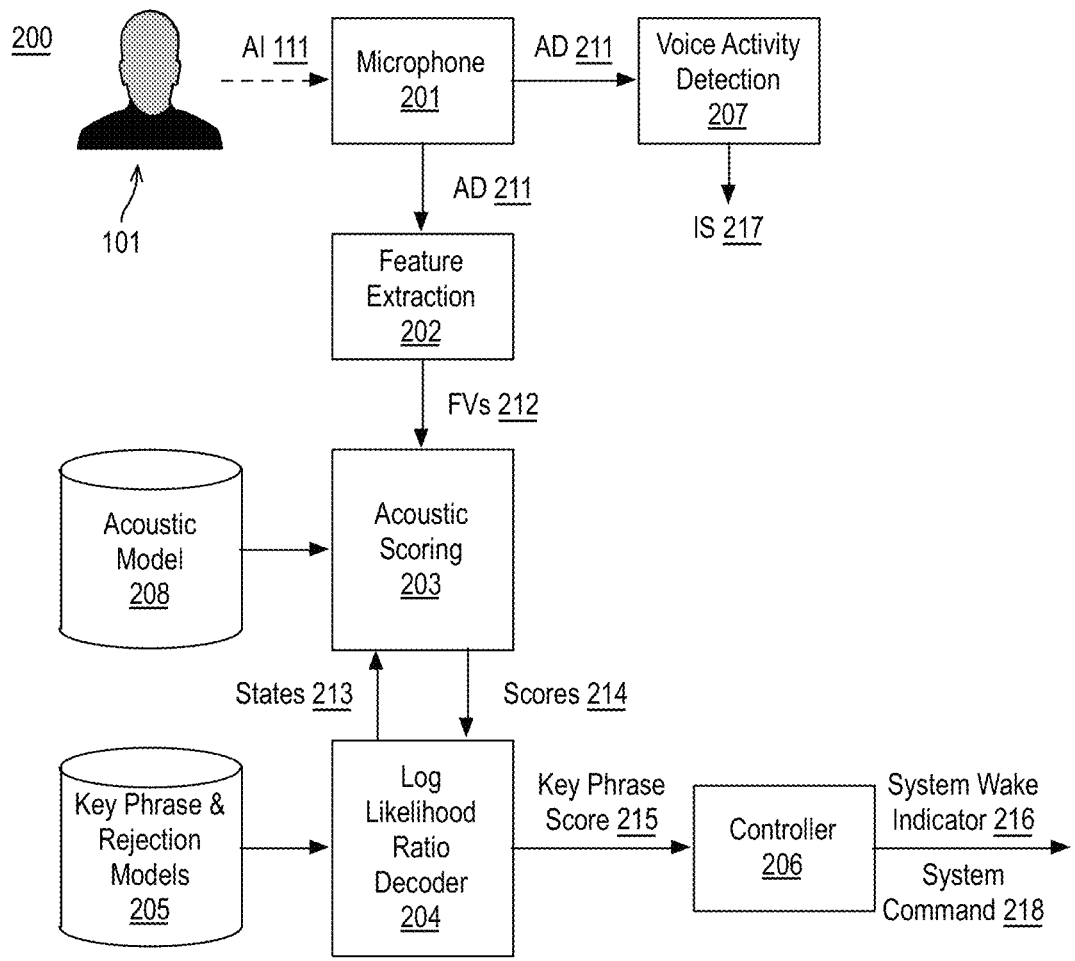
FIG. 2 is an illustrative diagram of an example system for providing key phrase detection.

FIG. 2 is an illustrative diagram of an example system 200 for providing key phrase detection, arranged in accordance with at least some implementations of the present disclosure. As shown in FIG. 2, system 200 may include a microphone 201, a feature extraction module 202, an acoustic scoring module 203, a log likelihood ratio decoder 204, key phrase and rejection models 205, a controller 206, an acoustic model 208, and a voice activity detection module 207. For example, as shown in FIG. 2, log likelihood ratio decoder 204 may provide a key phrase score 215 to controller 206. Based on key phrase score 215 (e.g., if key phrase score 215 is greater than a threshold or the like), controller 206 may provide a system wake indicator 216 (e.g., if key phrase score 215 indicates a predetermined key phrase has been matched) or controller 206 may not provide such an indicator and system 200 may continue evaluating input speech for a match. As shown, in some examples, controller 206 may also provide a system command 218 associated the key phrase to request system 200 perform an operation such as starting an application, generating or retrieving data, or the like. As is discussed further herein, in some embodiments, feature extraction module 202, acoustic scoring module 203, log likelihood ratio decoder 204, controller 206, and voice activity detection module 207 may be implemented via a digital signal processor (DSP).

As discussed, in some embodiments, system 200 may implement a single key phrase such that, upon detection of the key phrase, system wake indicator 216 and/or system command 218 may be provided. In other embodiments, system 200 may implement multiple key phrases (based on implementing multiple key phrase models as discussed herein). In such embodiments, if any of the key phrases are detected, system wake indicator 216 and/or system command 218 may be provided. Furthermore, system command 218 may be associated with a particular key phrase of the key phrases. For example, a first wake up command (e.g., key phrase) such as "Computer, Play Music" may wake the device (e.g., via system wake indicator 216) and play music (e.g., via a music play command implemented by system command 218) and a second wake up command (e.g., key phrase) such as "Computer, Do I Have Mail? may wake the device (e.g., via system wake indicator 216) and determine whether mail has been received (e.g., via a get mail command implemented by system command 218).

As shown, microphone 201 may receive audio input (AI) 111 from user 101 (or multiple users or an environment or the like). In some examples, audio input 111 is issued by user 101 to wake system 200 and/or to have system 200 perform an operation. As discussed, microphone 201 may receive audio input that is not intended to wake system 200 or other background noise or even silence. For example, audio input 111 may include any speech issued by user 101 and any other background noise or silence or the like in the environment of microphone 201. Audio input 111 may be characterized as audio, input audio, an input speech stream, or the like. Microphone 201 may receive audio input 111 and/or other audio (e.g., as sound waves in the air) and convert audio input 111 and/or such other audio to an electrical signal such as a digital signal to generate audio data (AD) 211. For example, audio data 211 may be stored in memory (not shown in FIG. 2), transferred for continued processing, or the like.

As shown, voice activity detection module 207 may receive audio data 211. For example, voice activity detection module 207 may operate (e.g., via a DSP) even in a deep sleep mode of system 200 to continuously monitor audio data 211. Upon detection of a voice or other sound that requires further evaluation by system 200, voice activity detection module 207 may provide initiation signal (IS) 217, which may activate the other modules of system 200 to provide key phrase detection. For example, voice activity detection module 207 may provide initiation signal 217 to feature extraction module 202 to activate feature extraction module 202 and other components of system 200. In an embodiment, a portion of audio data 211 (e.g., 360 ms of audio data or the like) may be buffered by a ring-buffer or the like. When a voice or other sound that requires further evaluation is detected by voice activity detection module 207, feature extraction module 202 may receive the data from the buffer and further incoming audio via audio data 211.

If a predetermined key phrase is detected, as discussed herein, system 200 may enter a higher level mode of operation for user 101. Furthermore, voice activity detection module 207 may operate during key phrase detection (e.g., while a key phrase is not detected or not yet detected) to determine whether system 200 may be put back into a deep sleep mode or the like. For example, voice activity detection module 207 may provide a low power always listening capability for system 200. For example, upon activation by initiation signal 217, audio data 211 may be continuously monitored for key phrase detection until controller 206 determines a key phrase has been detected and system wake indicator 216 is provided or until a determination is made by voice activity detection module 207 to reenter a sleep mode or low power state or the like.

As discussed, feature extraction module 202 may receive audio data 211. For example, feature extraction module 202 may receive audio data 211 from microphone 201, from the discussed buffer, from other memory of system 200, or the like and feature extraction module 202 may generate feature vectors 212 associated with audio input 111. Feature vectors 212 may be any suitable features or feature vectors or the like representing audio input 111. For example, feature vectors 212 may be a time series of feature vectors (e.g., feature vectors each generated for an instance of time) such that each of feature vectors 212 includes a stack of features or feature vectors each from an instance of time such as a sampling time or the like.

Figure 3:
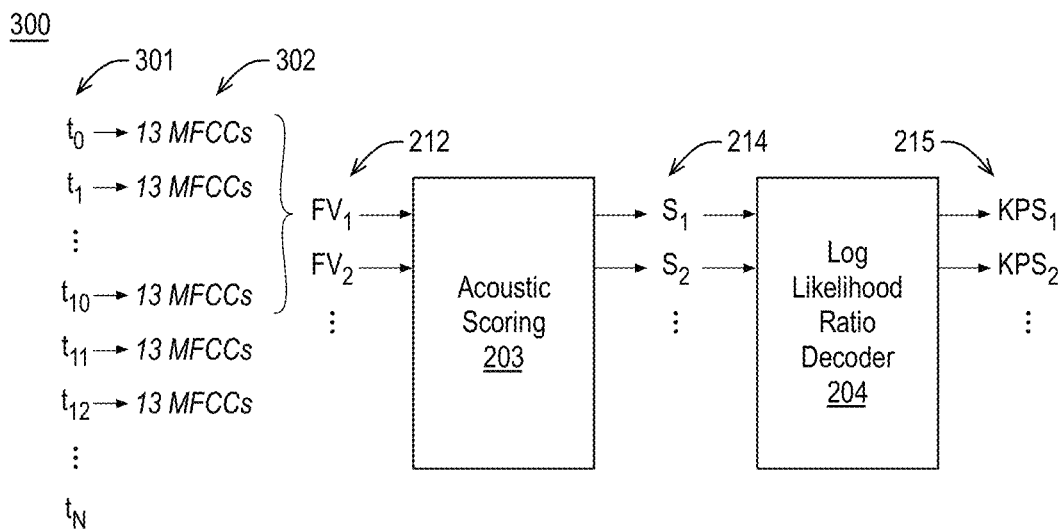
FIG. 3 illustrates example data structures associated with key phrase detection.

FIG. 3 illustrates example data structures 300 associated with key phrase detection, arranged in accordance with at least some implementations of the present disclosure. As shown in FIG. 3, at each of multiple sampling times 301 (e.g., represented as sampling times $t_0, t_1, \ldots, t_N$), sampling coefficients 302 such as Mel frequency cepstrum coefficients (MFCCs) or the like may be generated. Sampling times 301 may be at any suitable interval such as every 10 ms or the like and the sampling performed at each sampling time of sampling times 301 may sample any duration of input speech or audio such as 25 ms of audio or the like. Sampling coefficients 302 may include any number of sampling coefficients such as 13 coefficients as in the illustrated example. Furthermore, sampling coefficients 302 may each be referred to as features, a feature vector, a sampling, or the like. For example, sampling coefficients 302 may be coefficients representing a power spectrum of the received audio.

As discussed, in an embodiment, sampling coefficients 302 are Mel frequency cepstrum coefficients representing a power spectrum of the received audio. For example, with reference to FIG. 2, Mel frequency cepstrum coefficients may be determined based on audio input 111 (e.g., via audio data 211) by taking a Fourier transform of audio input 111 and/or audio received via microphone 201, mapping to the Mel scale, determining logs of the powers at each Mel frequency, and determining the Mel frequency cepstrum coefficients based on a discrete cosine transform (DCT) of the logs of the powers.

With continued reference to FIG. 3, sampling coefficients 302 may be stacked or concatenated or combined or the like to generate feature vectors 212. As shown, in an embodiment, 11 instances of sampling coefficients 302 may be combined to generate each feature vector of feature vectors 212. Furthermore, prior to stacking, sampling coefficients 302 may be normalized or the like. For example, Mel frequency cepstrum coefficients may be processed by cepstral mean normalization or the like to generate sampling coefficients 302. As shown, in an embodiment, 11 instances of sampling coefficients 302 may be combined to generate each feature vector such that each feature vector is a 143 (e.g., 11×13) dimensional vector. However, any number of instances of sampling coefficients 302 may be combined or stacked to generate feature vectors 212. As shown, feature vector $FV_1$ may include sampling coefficients associated with times $t_0$-$t_{10}$. Furthermore, feature vector $FV_2$ may include sampling coefficients associated with times $t_1$-$t_{11}$, feature vector $FV_3$ may include sampling coefficients associated with times $t_2$-$t_{12}$, and so on such that adjacent feature vectors have overlap with respect to sampling coefficients 302 that are included therein.

As shown in FIGS. 2 and 3, feature vectors 212 may be provided to acoustic scoring module 203. Acoustic scoring module 203 may score feature vectors 212 based on acoustic model 208 as received via memory and provide any number of output scores 214 based on feature vectors 212. Output scores 214 may be characterized as scores, probabilities, scores of sub-phonetic units, or the like. For example, acoustic scoring module 203 may generate such output scores or states for each of feature vectors 212 to generate a time series of scores 214 (e.g., represented as scores $S_1$, $S_2$, . . . in FIG. 3). For example, scores 214 may be a time series of scores of sub-phonetic units. In an embodiment, acoustic scoring module 203 receives and implements acoustic model 208 as discussed herein. In an embodiment, acoustic model 208 may be a deep neural network (DNN) pretrained based on a training set of audio. In an embodiment, acoustic model 208 may be a deep neural network having any number of outputs such as 4,000 outputs or the like. In another embodiment, acoustic model 208 is a pruned deep neural network having the number of outputs reduced or pruned such that only a subset of available outputs (e.g., as determined set-up and/or training) are provided or activated. Such pruning may provide a smaller memory footprint and/or lower computational requirements during implementation. Such required outputs may be provided by states signal 213 or such required outputs may be preset or pretrained prior to implementation.

For example, the outputs of acoustic scoring module 203 (e.g., scores 214) may represent sub-phonetic units such as tied context-dependent triphone states. Such tied context-dependent triphone states may represent monophones tied to monophones on either side (e.g., left and right) to generate tied context-dependent triphones. A language, for example, may have a number of monophones (e.g., 30-50 monophones) and sub-phonetic units such as exemplary tied context-dependent triphone states may include each of such monophones in a variety of contexts such that various other monophones are before and after such monophones to generate many combinations (e.g., the sub-phonetic units). Acoustic scoring module 203 may, based on feature vectors 212, provide probabilities or scores or the like associated with such sub-phonetic units (e.g., probabilities or scores as to which unit or phone has been spoken) as well as probabilities or scores associated with silence and/or background noise or the like at its outputs. As shown in FIG. 3 and as discussed further herein, for each or some of scores 214, log likelihood ratio decoder may generate a corresponding key phrase score 215 (e.g., represented as key phrase scores $KPS_1$, $KPS_2$, . . . ). In the example of FIG. 3, a key phrase score 215 is generated at each time instance as associated with scores 214. In other examples, a key phrase score 215 may be generated at less frequent time intervals.

Furthermore, as discussed, in some embodiments, a single key phrase may be detected and a system may be woken (e.g., via system wake indicator 216) and an optional command may be issued (e.g., via system command 218) based on the detected key phrase. In other embodiments, a second or additional key phrases may be implemented and associated key phrase models may be evaluated by log likelihood ratio decoder 204. For example, such key phrase models may be evaluated and associated key phrase scores may be evaluate to determine whether a particular key phrase of multiple key phrases has been detected. For example, as discussed further with respect to FIG. 5, multiple key phrase models may be provided. In the context of FIG. 3, log likelihood ratio decoder 204 may generate a key phrase score or scores for each of such key phrase models (and at multiple time instances) for evaluation by controller 206.

Figure 4:
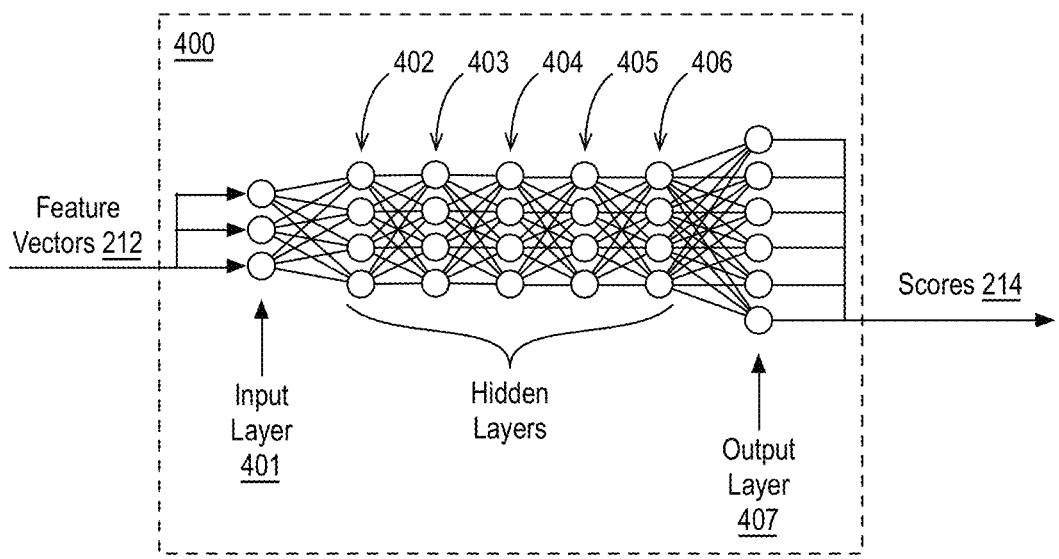
FIG. 4 illustrates an example acoustic model deep neural network.

FIG. 4 illustrates an example acoustic model neural network 400, arranged in accordance with at least some implementations of the present disclosure. For example, neural network 400 may be implemented as acoustic scoring module 203 in some embodiments. Neural network 400 may include any suitable neural network such as an artificial neural network, a deep neural network, a convolutional neural network, or the like. As shown in FIG. 4, neural network 400 may include an input layer 401, hidden layers 402-406, and an output layer 407. Neural network 400 is illustrated as having three input nodes, hidden layers with four nodes each, and six output nodes for the sake of clarity of presentation, however, neural network 400 may include any such input, hidden, and output nodes. Input layer 401 may include any suitable number of nodes such as a number of nodes equal to the number of elements in each of feature vectors 212. For example, input layer 401 may have 143 nodes corresponding to each of the 143 dimensions of feature vectors 212. In other examples, feature vectors may have fewer or more elements or dimensions and input layer 401 may have a corresponding number of nodes.

Furthermore, as in the illustrated example, neural network 400 may include five hidden layers 402-406. However, neural network 400 may include any number of hidden layers. Hidden layers 402-406 may include any number of nodes. For example, hidden layers 402-406 may include 1,500 to 2,000 nodes, 2,000 to 2,500 nodes, or the like. In some examples, hidden layers 402-406 have the same number of nodes and, in other examples, one or more layers may have different numbers of nodes. Output layer 407 may include any suitable number of nodes such that scores 214 include values corresponding to tied context-dependent triphone states or the like. In some examples, neural network 400 may implement Hidden Markov Models (HMMs). As discussed, in some embodiments, output layer 407 may be pruned such that only predetermined output nodes (and associated scores 214) are provided such that a subset of available states or scores are implemented via neural network 400.

Returning to FIG. 2, as discussed, scores 214 from acoustic scoring module 203 may be provided to log likelihood ratio decoder 204. Also, as shown, log likelihood ratio decoder 204 may also receive and implement a key phrase model (or multiple key phrase models) and a rejection model. For example, log likelihood ratio decoder 204 may receive a key phrase model (or multiple key phrase models) and a rejection model (e.g., key phrase and rejection models 205) from memory.

Figure 5:
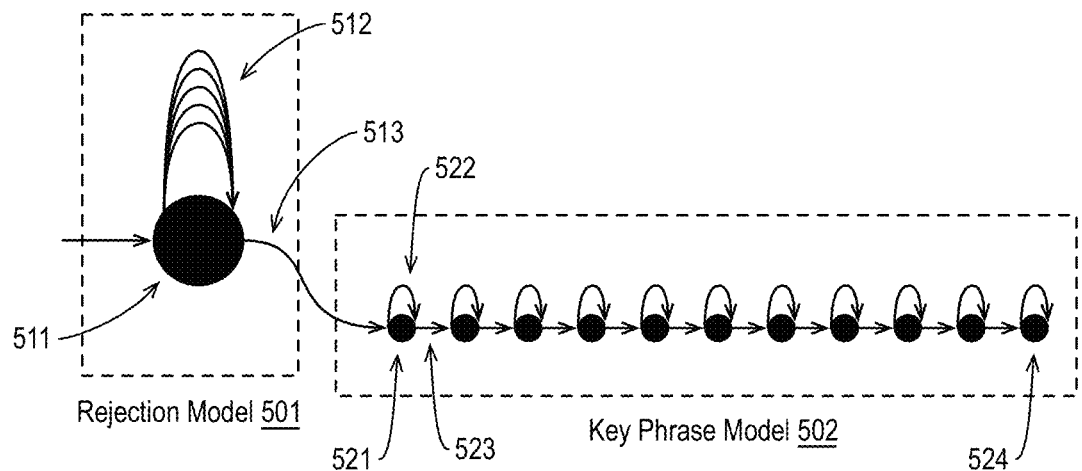
FIG. 5 illustrates an example rejection model and an example key phrase model.

FIG. 5 illustrates an example rejection model 501 and an example key phrase model 502, arranged in accordance with at least some implementations of the present disclosure. As shown in FIG. 5, rejection model 501 may include a single state 511 and multiple self loops 512. For example, single state 511 may correspond to a start state and may provide a single start state based rejection model. Furthermore, each of self loops 512 may be associated with one of scores 214 (e.g., an output from acoustic scoring module 203) such that self loops 512 provide self updates or summing or the like for single state 511 of rejection model 501. For example, each of self loops 512 may be associated with a deep neural network output or output node that corresponds to a sub-phonetic unit. Using such techniques, for example, single state 511 may provide a start state that implements a rejection model. Self loops 512 may include any number of self loops. As discussed, in an embodiment, acoustic scoring module 203 may not be pruned and, in such an embodiment, self loops 512 may include thousands of self loops. In other embodiments, acoustic scoring module 203 may be pruned and, in such embodiments, self loops 512 may include tens of self loops associated with likely rejection states. For example, at each time instance of outputs from acoustic scoring module 203, rejection model 501 may be updated to provide a rejection likelihood score associated therewith. For example, self loops 512 may illustrate updates to single state 511 at each time instance of outputs (e.g., scores 214) from acoustic scoring module 203. In an embodiment, self loops 512 may be associated with pruned output scores from acoustic scoring module 203 as is discussed further herein.

Rejection model 501 having single state 511 may provide a greatly reduced rejection model 501 (e.g., in terms of memory and computational resources usage) as compared to conventional rejection models, which may implement many equally possible words or phrases or the like in parallel and may require Viterbi decoding with backtracking to provide for a most probable sequence to determine a rejection likelihood.

Also as shown in FIG. 5, key phrase model 502 may be subsequent to rejection model 501 and connected by transition 513. Key phrase model 502 may include multiple states 521 interconnected by transitions 523. Each of states 521 may include or be updated by one or more self loops such as self loop 522 and each of states 521 may be updated based on a transition of transitions 523 or transition 513 from a prior state in key phrase model 502. For example, each self loop 522 (or arc) may be associated with or correspond to an output (e.g., a score of scores 214) from acoustic scoring module 203. In the illustrated example, each of states 521 has a single self loop 522. However, one or more of states 521 may include multiple self loops. In some examples, one or more of states 521 may be silence states having self loops representative of silence such that key phrases may be modeled that include silence. Key phrase model 502 may include any suitable model. For example, key phrase model 502 may be selected based on the predetermined key phrase implemented via system 200 and key phrase model 502 may be selected based on a lexicon look up. For example, transitions 523 between states 521 may be selected based on the triphone-HMM-state sequence in the lexicon.

Based on rejection model 501 and key phrase model 502, at each or some time instances, a rejection likelihood score and a key phrase likelihood score may be determined. For example, the rejection likelihood score may be a score associated with single state 511 of rejection model 501 and the key phrase likelihood score may be associated with final state 524 of states 521 of key phrase model 502. For example, rejection model 501 and key phrase model 502 may be initialized with all nodes or states thereof at null or negative infinity or the like. With reference to FIGS. 2 and 5, based on a first feature vector $FV_1$, acoustic scoring module 203 may generate scores $S_1$, and single state 511 of rejection model 501 and a first state of key phrase model 502 may be updated. Upon a second feature vector $FV_2$ being processed, acoustic scoring module 203 may generate scores $S_2$, and single state 511 of rejection model 501 and a first and second state of key phrase model 502 may be updated. Such processing may continue until final state 524 is updated from its initialization state to a meaningful scoring. At such a time instance (and subsequent time instances as updates continue), the score or probability or the like of single state 511 and the score or probability or the like of final state 524 may be used to determine whether the predetermined key phrase has been detected. For example, a time series of key phrase scores 215 may be generated by log likelihood ratio decoder 204 based on scores 214, rejection model 501, and key phrase model 502.

Key phrase scores 215 may include any suitable key phrase score that compares the likelihood generated at single state 511 with the likelihood generated at final state 524. In an embodiment, a key phrase score of key phrase scores 215 may be a log likelihood ratio. For example, a key phrase score of key phrase scores 215 may be determined as shown in Equation (1):

$$KPS=\log(p(X|KeyPhrase))-\log(p(X|Reject)) \quad (1)$$

where KPS may be the key phrase score, X may be the current accumulation of feature vectors being evaluated, and p provides a probability X is a member of KeyPhrase or Reject.

Returning to FIG. 2, as shown, controller 206 may receive key phrase score 215 (e.g., a time series of key phrase scores) and controller 206 may compare key phrase score 215 to a threshold or the like to determine whether the predetermined key phrase has been detected. For example, if key phrase score 215 is greater than (or greater than or equal to) the threshold, the predetermined key phrase has been detected and controller 206 may provide system wake indicator 216 to wake system 200. If key phrase score 215 is less than (or less than or equal to) the threshold, the predetermined key phrase has not been detected and controller 206 may not provide system wake indicator 216 and controller may continue to monitor key phrase score 215.

Returning to FIG. 5, for example, a key phrase score (e.g., of key phrase scores 215) may be determined for each feature vector (e.g., of feature vectors 212) based on the following pseudo-code:

Pseudo Code (1)

```
scores[ ] = new array[2][numStates];
init_with_-inf(scores);
current=0;
For x=0,...,N-1:
    next = 1 - current;
    For each state in model:
        curScore = scores[curBuffer][state];
        For each (transition,destState) per State:
            dnn_score = getDNNscore(transition,x);
            new_score = dnn_score + curScore;
            if(new_score>score[next][destState]):
                score[next][destState] = new_score;
    current=next;
```

Based on Pseudo Code (1), the predetermined key phrase may be detected when score[current][length(score)]−score[current][0]>threshold, where score[current][0] may be the score at the single state of the rejection model and score[current][length(score)] may be the score at the final state of the key phrase model. The provided threshold may be any suitable threshold. For example, the threshold may be varied to implement various levels of security and/or usability. For example, a low threshold may lower the required confidence (and may therefore have more false accepts) while a higher threshold may have fewer false accepts but a higher amount of false rejects in noisy conditions.

For example, Pseudo Code (1) may provide for updating, for each state in the rejection model and the key phrase model, a score for the state based on the score(s) from the acoustic model associated with the state and the score(s) transitioned to the state from any associated states of the model. Thereby, continual summing at each state of the rejection model and the key phrase model may be provided and such scores at the single state of the rejection model and the score at the final state of the key phrase model may be modeled as a log likelihood ratio difference and compared to a threshold as discussed to determine whether or not the predetermined key phrase has been detected. For example, scores may be an array of the number of states (e.g., numStates) in the rejection model and the key phrase model, x may be a counter variable, curScore may the scores for the states at a current iteration, dnn_score may be a score retrieved from the acoustic model (e.g., a DNN model), and new_score may be an updated score for the state of the rejection/key phrase model for the iteration. As discussed, after updates at the current iteration, the score at the single state of the rejection model (e.g., score[current][0]) and the score at the final state of the key phrase model (e.g., score[current][length(score)]) may be used to determine whether the key phrase has been detected.

As discussed, in some embodiments, acoustic scoring module 203 may be pruned prior to implementation via system 200. Furthermore, rejection model 501 and key phrase model 502 may be generated based on the outputs (e.g., scores 214) available from pruned acoustic scoring module 203. Such pruning and model generation may provide a key phrase detection model that provide slow resource usage in terms of memory footprint, computational resources, and power usage. Such low resource usage may be advantageous in the context of wake on voice implementations, for example.

As discussed herein and as shown in FIG. 5, in some embodiments, a single key phrase model 502 may be implemented (e.g., for a single key phrase). In other embodiments, multiple key phrase models (e.g., each associated with a different key phrase) may be implemented. For example, each of the multiple key phrase models may be subsequent to rejection model 501 and connected to rejection model 501 by a transition in analogy to key phrase model 502 being connected to rejection model 501 by transition 513. Furthermore, as discussed with respect to key phrase model 502, each of the multiple key phrase models may include multiple states interconnected by transitions and each of the states may include or be updated by one or more self loop such that the states may be updated based on a transition from a prior state in the key phrase model (or the transition from rejection model 501). As discussed, each self loop may be associated with an output (e.g., a score) from acoustic scoring module 203.

Based on rejection model 501 and each of the multiple key phrase models, at each or some time instances, a rejection likelihood score and a key phrase likelihood score for each key phrase model may be determined. For example, the rejection likelihood score may be a score associated with single state 511 of rejection model 501 and the key phrase likelihood score may be associated with a final state of the states of each of the multiple key phrase models. Based on the rejection likelihood score and the key phrase likelihood score of each of the multiple key phrase models, a key phrase score for each of the multiple key phrase models may be generated as discussed herein.

For example, returning to FIG. 2, controller 206 may receive such key phrase scores (e.g., a time series of key phrase scores) and controller 206 may compare such key phrase scores to a threshold or respective thresholds to determine whether any of the predetermined key phrases have been detected. For example, if any of the key phrase scores is greater than (or greater than or equal to) the threshold or its respective threshold, a particular predetermined key phrase has been detected and controller 206 may provide system wake indicator 216 to wake system 200 and an optional command indicator (e.g., system command 218) to perform a command associated with the particular predetermined key phrase. If all of the key phrase scores are less than (or less than or equal to) the threshold or their respective thresholds, controller 206 may not provide system wake indicator 216 and controller may continue monitoring for a predetermined key phrase.

Figure 6:
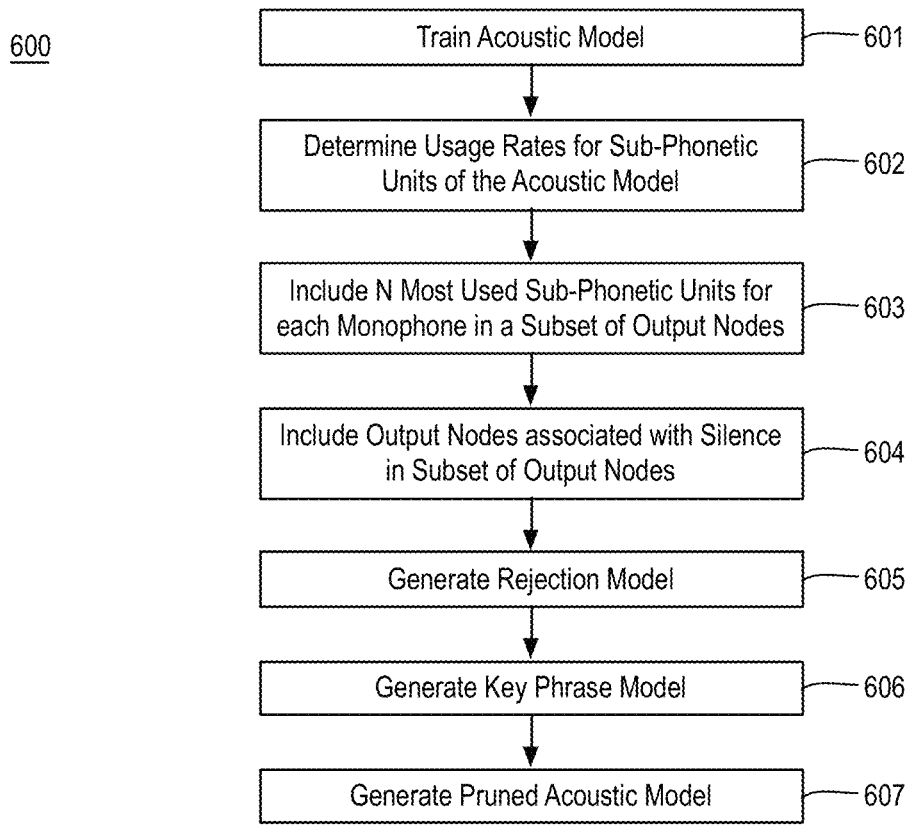
FIG. 6 illustrates an example process for generating a key phrase detection model.
Figure 7:
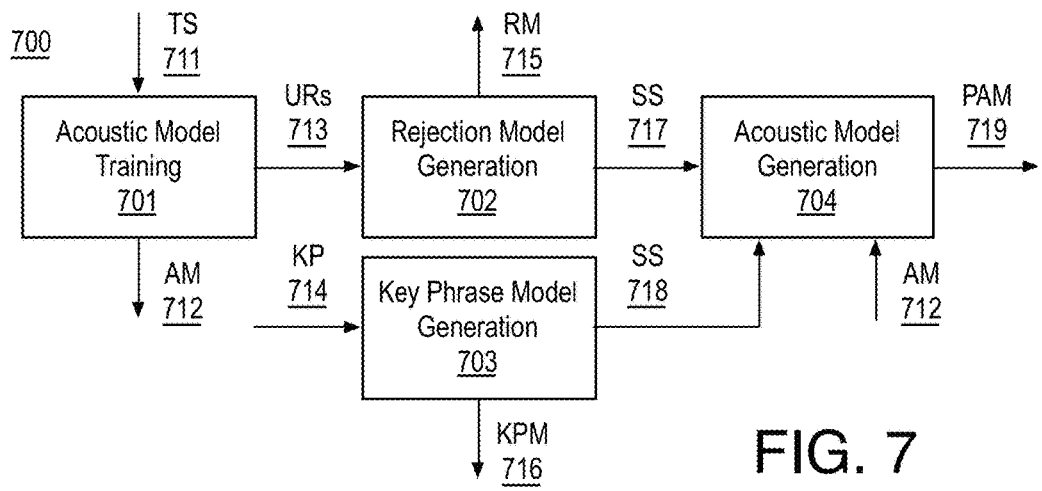
FIG. 7 is an illustrative diagram of an example system for generating a key phrase detection model.

FIG. 6 illustrates an example process 600 for generating a key phrase detection model, arranged in accordance with at least some implementations of the present disclosure. Process 600 may include one or more operations 601-607 as illustrated in FIG. 6. Process 600 or portions thereof may be performed by a device or system (e.g., system 700 or any other device or system discussed herein) to generate a key phrase detection model. Process 600 or portions thereof may be repeated for any number key phrases (e.g., any number of predetermined key phrases) to be used for detection via a device or system. Furthermore, process 600 will be discussed with reference to system 700 as shown in FIG. 7. For example, as used herein a key phrase detection model may include a start state based rejection model, a key phrase model, and a pruned acoustic model.

FIG. 7 is an illustrative diagram of an example system 700 for generating a key phrase detection model, arranged in accordance with at least some implementations of the present disclosure. As shown, system 700 may include an acoustic model training module 701, a rejection model generation module 702, a key phrase model generation module 703, and acoustic model generation module 704. Furthermore, acoustic model training module 701 may train an initial or starting acoustic module 712 based on a training set (TS) 711 and may generate usage rates (URs) 713 associated with outputs of the acoustic model being trained. Usage rates 713 may be provided to rejection model generation module 702, which may select a subset (SS) 717 of available outputs of the acoustic model being trained, as is discussed further herein. Acoustic model generation module 704, rejection model generation module 702, and key phrase model generation module 703 may generate pruned acoustic model (PAM) 719 (which also may be characterized or described as an acoustic model), rejection model (RM) 715, and key phrase model (KPM) 716, respectively, as is discussed further herein.

Returning to FIG. 6, as shown, process 600 may begin at operation 601, where an acoustic model may be trained. The acoustic model may include any suitable acoustic model such as an artificial neural network, a deep neural network, a convolutional neural network, or the like as discussed herein. For example, at operation 601, a full neural network or model (e.g., having a full set of available output nodes) may be trained based on a predetermined training set of audio input. For example, the full set of available output nodes may include output nodes corresponding to scores of sub-phonetic units such as tied triphone HMM-states as discussed herein. Furthermore, the full set of available output nodes may include output nodes corresponding to silence, noise, or the like. For example, acoustic model training module 701 may train acoustic model 712 based on training set 711.

Figure 8:
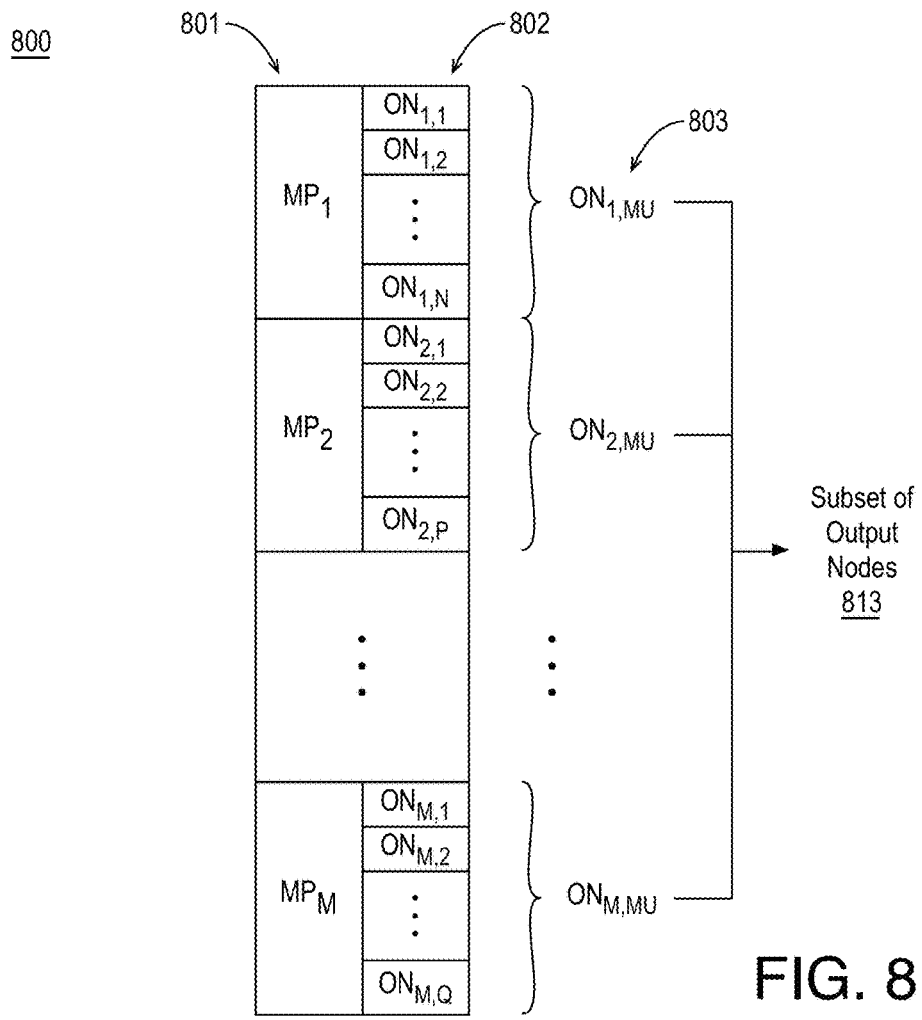
FIG. 8 illustrates example data structures associated with generating a key phrase detection model.

FIG. 8 illustrates example data structures 800 associated with generating a key phrase detection model, arranged in accordance with at least some implementations of the present disclosure. As shown in FIG. 8, a lexicon or the like may include multiple monophones 801 associated therewith (e.g., labeled $MP_1$, $MP_2$, ..., $MP_M$) in FIG. 8. For example, the pronunciation of a word or phrase in a language or lexicon may be represented as a series of individual units of sound, which may be characterized as phones and a monophone may be characterized as a single phone. A lexicon or language or the like may include any number of monophones 801. Also shown in FIG. 8, for each monophone, multiple output nodes 802 may be generated. For example, each sub-phonetic unit or tied triphone HMM-state may correspond to an output node as discussed herein. For example, tied triphone HMM-state may have a monophone with tied monophones on either side thereof. For example, output nodes $ON_{1,1}$-$ON_{1,N}$ may correspond to monophone $MP_1$, output nodes $ON_{2,1}$-$ON_{2,P}$ may correspond to monophone $MP_2$, and so on such that output nodes $ON_{M,1}$-$ON_{M,Q}$ may correspond to monophone $MP_M$. For example, each of output nodes 802 may be associated with a particular monophone of monophones 801. As shown, each monophone of monophones 801 may include any number of associated output states of output nodes 802.

In some examples that implement tied triphone HMM-states, there may be an overlap in the sub-phonetic units/output nodes. For example, $ON_{1,2}$ might also be used in some sub-phonetic unit of $MP_2$ and so on. For example, the structure may be provided as follows: Monophone→triphone→sub-phonetic units/ON. For example, the triphone a/b/a and the triphone e/t/a may each have 3 sub-phonetic units. However, the second /a/ in both triphones might share the same sub-phonetic unit. Furthermore, the acoustic model being trained based on process 600 and system 700 may include an output node for each of output nodes 802 as well as output nodes associated with silence, background noise, or the like.

Returning to FIG. 6, processing may continue at operation 602, where usage rates may be determined for output nodes of the acoustic model corresponding to context-dependent triphone HMM-states. For example, with reference to FIG. 7, acoustic model training module 701 may generate usage rates 713. The usage rates may be determined using any suitable technique or techniques. For example, during training, when an output node of the acoustic model is used or has a non-zero output or the like, a usage rate associated with the output node may be incremented. Such tracking of usage rates may be performed during the entirety of training or portions thereof.

As shown, processing may continue at operation 603, where a subset of the available output nodes may be generated that includes the highest use output node or nodes associated with each monophone. For example, with reference to FIG. 8, for each monophone of monophones 801, a highest usage rate output node may be determined to generate highest usage rate output nodes 803. For example, highest usage rate output node $ON_{1,MU}$ may correspond to monophone $M_1$, highest usage rate output node $ON_{2,MU}$ may correspond to monophone $M_2$, and so on. Such highest usage rate output nodes 803 may be included in subset of output nodes 813 for use in a rejection model (e.g., rejection model 715). In the illustrated example, highest usage rate output nodes 803 includes a single highest usage node for each monophone. However, any number of highest usage rate output nodes may be used for each monophone. The number of output nodes for each monophone may be the same or they may be different. For example, a threshold may be applied to determine the number of output nodes for each monophone such that all output nodes having a usage rate greater than a threshold may be used for each monophone.

Returning to FIG. 6, processing may continue at operation 604, where output nodes of the acoustic model associated with or corresponding to silence may be included in the subset of output nodes. For example, all or some of the output nodes of acoustic model 712 corresponding to non-speech, silence, and/or background noise may be included in the subset of output nodes. In some examples, the output nodes corresponding to noise or the like may also be included in the subset of output nodes. In an embodiment, with reference to FIG. 7, rejection model generation module 702 may perform operations 603 and 604 to generate subset 717.

As shown in FIG. 6, processing may continue at operation 605, where a rejection model may be generated based on the subset of output nodes. For example, the rejection model may include a start based rejection model having a single state and self loops associated with the subset of output nodes generated via operations 603 and 604 as discussed with respect to FIG. 5 and elsewhere herein. For example, the self loops of rejection model may be associated with the output nodes generated via operations 603 and 604. For example, rejection may be performed in a start or first state of a recognition graph by a self loop of tied triphone HMM states. The rejection model may include as self loops such output nodes (e.g., HMM states) corresponding to non-speech (e.g., non-speech states) and those that are most used during training (e.g., the subset determined at operation 603 or the like). With reference to FIG. 7, subset 717 may include output nodes used by rejection model 715 (e.g., and subset 717 may not be pruned from pruned acoustic model 719).

Processing may continue at operation 606, where a key phrase model or models may be generated. For example, the key phrase model may include a multi-node or multi-state lexicon look up key phrase model having transitions between each state and/or self-loops of each state associated with one or more of the output nodes as discussed with respect to FIG. 5 and elsewhere herein. For example, with reference to FIG. 7 the generated key phrase model (e.g., key phrase model 716) may include a second subset (e.g., subset 718) of the output nodes of acoustic model 712 (although there may be overlap as well). For example, with reference to FIG. 7, key phrase model generation module 703 may, responsive to key phrase 714 (or multiple key phrases) generate key phrase model 716 (or multiple key phrase models). Furthermore, key phrase model generation module 703 may provide a subset 718 indicating output nodes used by key phrase model 716 (or multiple key phrase models). For example, subset 718 may be transferred to acoustic model generation module 704 and subset 718 may include output nodes used by key phrase model 716 (or multiple key phrase models) such that subset 718 may not be pruned from pruned acoustic model 719). For example, the two subsets of the output nodes of acoustic model 712 (e.g., subset 717 used in rejection model 715 and subset 718 used in key phrase model 718) may define the output nodes needed in pruned acoustic model 719.

Processing may continue at operation 607, where a pruned acoustic model may be generated based on the subset(s) of output nodes needed for implementation. For example, the pruned acoustic model may include outputs associated with the subset of output nodes determined via operations 605 and 606 or the like while other outputs are pruned or eliminated from the pruned acoustic model. As discussed, such pruning may provide for a low resource acoustic model during implementation. For example, with reference to FIG. 7, acoustic model generation module 704 may receive subset 717, subset 718, and acoustic model 712 and acoustic model generation module 704 may discard or remove outputs not associated with subsets 717, 718 from acoustic model 712 to generate pruned acoustic model 719. For example, the number of outputs may reduced from about 4,000 outputs to about 100 outputs.

As discussed, acoustic model generation module 704 may implement operation 607 to generate pruned acoustic model 719, rejection model generation module 702 may implement operations 603, 604, and 605 to generate rejection model 715, and key phrase model generation module 703 may implement operation 606 to generate key phrase model 716.

Figure 9:
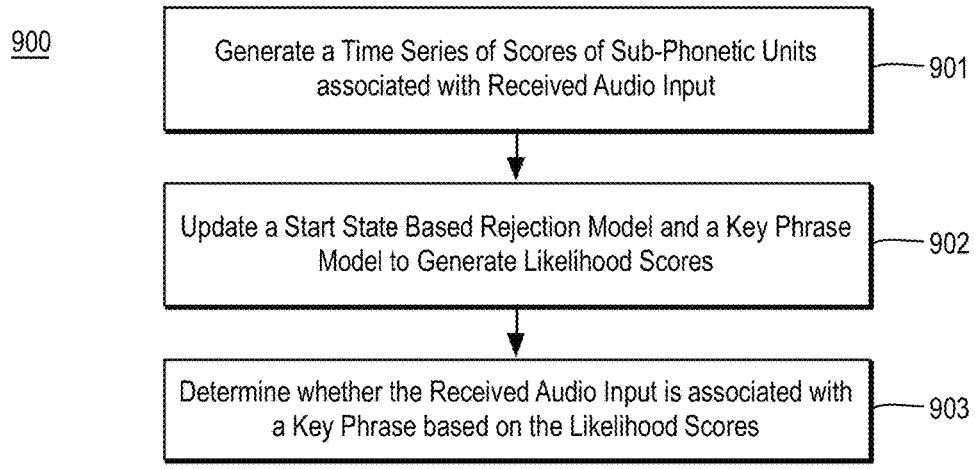
FIG. 9 is a flow diagram illustrating an example process for key phrase detection.

FIG. 9 is a flow diagram illustrating an example process 900 for key phrase detection, arranged in accordance with at least some implementations of the present disclosure. Process 900 may include one or more operations 901-903 as illustrated in FIG. 9. Process 900 may form at least part of a key phrase detection process performed, for example, by system 200. Furthermore, process 900 will be described herein in reference to system 1000 of FIG. 10.

Figure 10:
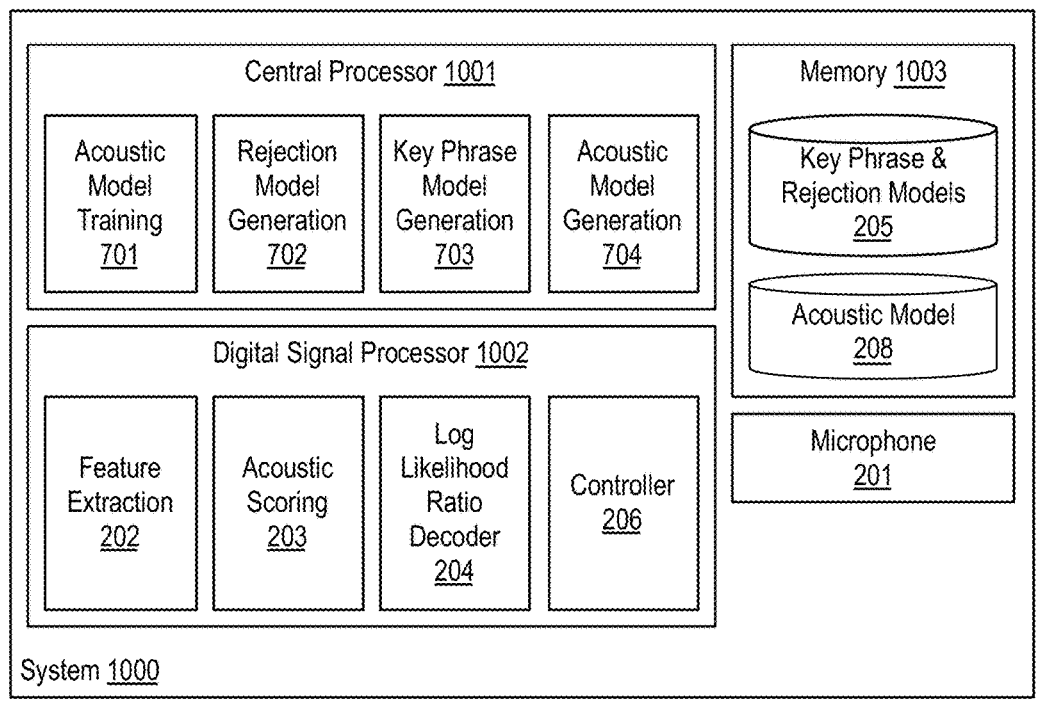
FIG. 10 is an illustrative diagram of an example system for performing key phrase detection and/or generation of a key phrase detection model.

FIG. 10 is an illustrative diagram of an example system 1000 for performing key phrase detection and/or generation of a key phrase detection model, arranged in accordance with at least some implementations of the present disclosure. As shown in FIG. 10, system 1000 may include a central processor 1001, a digital signal processor 1002, a memory 1003, and microphone 201. Also as shown, central processor 1001 may include acoustic model training module 701, rejection model generation module 702, key phrase model generation module 703, and acoustic model generation module 704. Furthermore, digital signal processor 1002 may include feature extraction module 202, acoustic scoring module 203, log likelihood ratio decoder 204, and controller 206. In some embodiments, digital signal processor 1002 may also include voice activity detection module 207. Also as shown, memory 1003 may store key phrase and rejection models 205 and acoustic model 208. Memory 1003 may also store audio data, input speech data, voice activity detection parameters or data, coefficient data, feature vectors, scores, output scores, key phrase scores, log likelihood scores, thresholds, or any other data or data structures as discussed herein.

Central processor 1001 and digital signal processor 1002 may include any number and type of processing units that may provide the operations as discussed herein. Such operations may be implemented via software or hardware or a combination thereof. For example, digital signal processor 1002 may include circuitry dedicated to manipulate data obtained from memory 1003 or dedicated memory. Furthermore, central processor 1001 may include any number and type of processing units or modules that may provide control and other high level functions for system 1000 as well as the operations as discussed herein. In the illustrated example, system 1000 may be configured to perform key phrase detection and generate a key phrase detection model. In an embodiment, system 1000 may exclude acoustic model training module 701, rejection model generation module 702, key phrase model generation module 703, and acoustic model generation module 704. In another embodiment, system 1000 may exclude feature extraction module 202, acoustic scoring module 203, log likelihood ratio decoder 204, and controller 206.

Memory 1003 may be any type of memory such as volatile memory (e.g., Static Random Access Memory (SRAM), Dynamic Random Access Memory (DRAM), etc.) or non-volatile memory (e.g., flash memory, etc.), and so forth. In a non-limiting example, system memory 1003 may be implemented by cache memory. As shown, in an embodiment, feature extraction module 202, acoustic scoring module 203, log likelihood ratio decoder 204, and controller 206 may be implemented via digital signal processor 1002. In another embodiment, feature extraction module 202, acoustic scoring module 203, log likelihood ratio decoder 204, and controller 206 may be implemented via central processor 1001. In other embodiments, all or some or portions of feature extraction module 202, acoustic scoring module 203, log likelihood ratio decoder 204, and controller 206 may be implemented via an execution unit (EU). The EU may include, for example, programmable logic or circuitry such as a logic core or cores that may provide a wide array of programmable logic functions.

Returning to discussion of FIG. 9, process 900 may begin at operation 901, where a time series of scores of sub-phonetic units may be generated, via acoustic scoring of an acoustic model, based on a time series of feature vectors representative of received audio input. For example, feature extraction module 202 as implemented via digital signal processor 1002 may generate a time series of feature vectors representative of received audio input as discussed herein. Furthermore, acoustic scoring module 203 as implemented via digital signal processor 1002 may generate the time series of scores of sub-phonetic units based on the time series of feature vectors and acoustic model 208. In an embodiment, acoustic scoring module 203 is a deep neural network and the time series of feature vectors includes a first feature vector including a stack of a time series of coefficients each associated with a sampling time.

Processing may continue at operation 902, where a start state based rejection model and a key phrase model associated with a predetermined key phrase may be updated based on at least some of the time series of scores of sub-phonetic units to generate a rejection likelihood score and a key phrase likelihood score. For example, log likelihood ratio decoder 204 as implemented via digital signal processor 1002 may update the start state based rejection model and the key phrase model associated with the predetermined key phrase to generate the rejection likelihood score and the key phrase likelihood score. For example, log likelihood ratio decoder 204 may implement the key phrase and rejection models stored via memory 1003 to determine the rejection likelihood score and the key phrase likelihood score. In an embodiment, the start state based rejection model includes self loops associated with at least some of the scores of sub-phonetic units determined at operation 901. In an embodiment, the start state based rejection model consists of only a single state preceding the key phrase model. In an embodiment, the key phrase model is a multi-state lexicon look up key phrase model having transitions associated with the lexicon look up for the predetermined key phrase. For example, the key phrase likelihood score may be associated with a final state of the multi-state lexicon look up key phrase model.

Processing may continue at operation 903, where a determination may be made as to whether the received audio input is associated with the predetermined key phrase based on the rejection likelihood score and the key phrase likelihood score. For example, controller 206 as implemented via digital signal processor 1002 may determine whether the received audio input is associated with the predetermined key phrase based on the rejection likelihood score and the key phrase likelihood score. In an embodiment, determining whether the received audio input is associated with the predetermined key phrase includes determining a log likelihood score based on the rejection likelihood score and the key phrase likelihood score and comparing the log likelihood score to a threshold. For example, if the log likelihood score is greater than the threshold, controller 206 may wake up system 1000 and, if not, controller 206 may continue to monitor log likelihood scores.

In some examples, multiple (e.g., two or more) key phrases and key phrase models may be implemented. For example, process 900 may further include updating a second key phrase model associated with a second predetermined key phrase based on at least some of the time series of scores of sub-phonetic units to generate a second key phrase likelihood score and whether the received audio input is associated with the second predetermined key phrase may be determined based on the rejection likelihood score and the second key phrase likelihood score. If the received audio input is associated with the second predetermined key phrase, a system wake indicator and/or a system command corresponding to the second predetermined key phrase may be provided. For example, the system command may be any suitable command for the system to take action corresponding to the second predetermined key phrase.

As discussed, in some embodiments, system 1000 may, in addition or in the alternative to performing key phrase detection, perform generation of a key phrase detection model. A key phrase detection model may include a start state based rejection model, a key phrase model, and a pruned acoustic model. For example, with reference to FIG. 6, acoustic model training module 701 as implemented via central processor 1001 may implement operation 601. For example, acoustic model training module 701 may train an acoustic model having a plurality of output nodes, the output nodes including multiple sub-phonetic units in the form of context-dependent tied triphone HMM states such that each of the tied triphone HMM-states is associated with one of multiple monophones. Furthermore, acoustic model training module 701 may determine a usage rate for each of the sub-phonetic units during the training by implementing operation 602. In an embodiment, determining the usage rate for each of the tied triphone HMM-states includes incrementing a first usage rate associated with a first tied triphone HMM-state when the first tied triphone state has a non-zero output during the training of the acoustic model.

Rejection model generation module 702 may implement operation 603 to generate a selected subset of the output nodes including at least one output node corresponding to a highest usage rate sub-phonetic unit for each of the plurality of monophones. In an embodiment, generating the selected subset of the output nodes includes providing, in the subset, at least a highest usage rate tied context-dependent triphone HMM-state associated with each of the plurality of monophones. In an embodiment, the output nodes of the acoustic model further include multiple silence nodes. For example, rejection model generation module 702 may optionally implement operation 604 to include non-speech nodes of the output nodes of the acoustic model in the selected subset.

Furthermore, rejection model generation module 702, key phrase model generation module 703, and acoustic model generation module 704 as implemented via central processor 1001 may implement operations 605, 606, and 607, respectively. For example, rejection model generation module 702 may generate a start state based rejection model as discussed herein such that the start state based rejection model includes a single state and self loops corresponding to the output nodes of the highest usage rate sub-phonetic unit for each of the multiple monophones of the selected subset of the output nodes and the output nodes associated with non-speech. Key phrase model generation module 703 may generate a key phrase model as discussed herein. In an embodiment, the key phrase model includes a multi-node lexicon look up key phrase model. In some examples, multiple key phrase models may be generated such that multiple key phrases may be implemented. As discussed, the acoustic model may include all needed outputs (e.g., those in the subset used by the rejection model and those in the subset used by the key phrase model or models). Acoustic model generation module 704 may implement operation 607 to generate a pruned acoustic model having outputs consisting of the discussed output nodes. For example, acoustic model generation module 704 may generate a pruned acoustic model having outputs consisting of the selected subset of the output nodes.

While implementation of the example processes discussed herein may include the undertaking of all operations shown in the order illustrated, the present disclosure is not limited in this regard and, in various examples, implementation of the example processes herein may include only a subset of the operations shown, operations performed in a different order than illustrated, or additional operations.

In addition, any one or more of the operations discussed herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more graphics processing unit(s) or processor core(s) may undertake one or more of the blocks of the example processes herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement any systems, operations, modules or components as discussed herein.

As used in any implementation described herein, the term "module" refers to any combination of software logic, firmware logic, hardware logic, and/or circuitry configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, fixed function circuitry, execution unit circuitry, and/or firmware that stores instructions executed by programmable circuitry. The modules may, collectively or individually, be embodied as circuitry that forms part of a larger system, for example, an integrated circuit (IC), system on-chip (SoC), and so forth.

Figure 11:
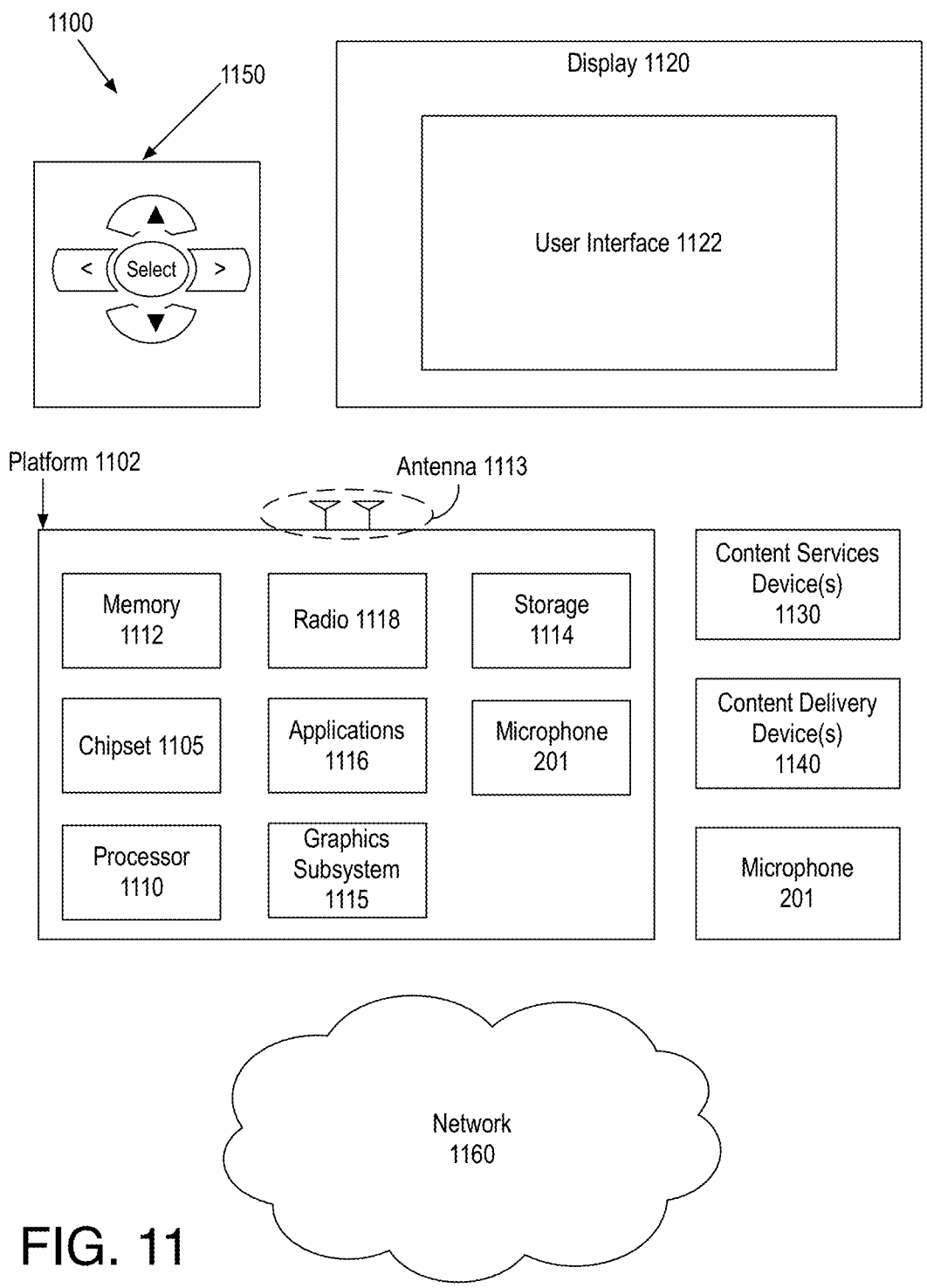
FIG. 11 is an illustrative diagram of an example system.

FIG. 11 is an illustrative diagram of an example system 1100, arranged in accordance with at least some implementations of the present disclosure. In various implementations, system 1100 may be a media system although system 1100 is not limited to this context. For example, system 1100 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, cameras (e.g. point-and-shoot cameras, super-zoom cameras, digital single-lens reflex (DSLR) cameras), and so forth.

In various implementations, system 1100 includes a platform 1102 coupled to a display 1120. Platform 1102 may receive content from a content device such as content services device(s) 1130 or content delivery device(s) 1140 or other similar content sources. As shown, in some examples, system 1100 may include microphone 201 implemented via platform 1102. Platform 1102 may receive input speech via microphone 201 as discussed herein. A navigation controller 1150 including one or more navigation features may be used to interact with, for example, platform 1102 and/or display 1120. Each of these components is described in greater detail below.

In various implementations, system 1100 may provide key phrase detection as described. For example, key phrase detection may be provide wake on voice capability for a device or environment as described. In other implementations, system 1100 may provide for generating a key phrase detection model (e.g., including an acoustic model, a rejection model, and a key phrase model). Such training may be performed offline prior to key phrase detection for example.

In various implementations, platform 1102 may include any combination of a chipset 1105, processor 1110, memory 1112, antenna 1113, storage 1114, graphics subsystem 1115, applications 1116 and/or radio 1118. Chipset 1105 may provide intercommunication among processor 1110, memory 1112, storage 1114, graphics subsystem 1115, applications 1116 and/or radio 1118. For example, chipset 1105 may include a storage adapter (not depicted) capable of providing intercommunication with storage 1114.

Processor 1110 may be implemented as a Complex Instruction Set Computer (CISC) or Reduced Instruction Set Computer (RISC) processors, x86 instruction set compatible processors, multi-core, or any other microprocessor or central processing unit (CPU). In various implementations, processor 1110 may be dual-core processor(s), dual-core mobile processor(s), and so forth.

Memory 1112 may be implemented as a volatile memory device such as, but not limited to, a Random Access Memory (RAM), Dynamic Random Access Memory (DRAM), or Static RAM (SRAM).

Storage 1114 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 1114 may include technology to increase the storage performance enhanced protection for valuable digital media when multiple hard drives are included, for example.

Graphics subsystem 1115 may perform processing of images such as still or video for display. Graphics subsystem 1115 may be a graphics processing unit (GPU) or a visual processing unit (VPU), for example. An analog or digital interface may be used to communicatively couple graphics subsystem 1115 and display 1120. For example, the interface may be any of a High-Definition Multimedia Interface, DisplayPort, wireless HDMI, and/or wireless HD compliant techniques. Graphics subsystem 1115 may be integrated into processor 1110 or chipset 1115. In some implementations, graphics subsystem 1115 may be a stand-alone device communicatively coupled to chipset 1105.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further embodiments, the functions may be implemented in a consumer electronics device.

Radio 1118 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 1118 may operate in accordance with one or more applicable standards in any version.

In various implementations, display 1120 may include any television type monitor or display. Display 1120 may include, for example, a computer display screen, touch screen display, video monitor, television-like device, and/or a television. Display 1120 may be digital and/or analog. In various implementations, display 1120 may be a holographic display. Also, display 1120 may be a transparent surface that may receive a visual projection. Such projections may convey various forms of information, images, and/or objects. For example, such projections may be a visual overlay for a mobile augmented reality (MAR) application. Under the control of one or more software applications 1116, platform 1102 may display user interface 1122 on display 1120.

In various implementations, content services device(s) 1130 may be hosted by any national, international and/or independent service and thus accessible to platform 1102 via the Internet, for example. Content services device(s) 1130 may be coupled to platform 1102 and/or to display 1120.

Platform 1102 and/or content services device(s) 1130 may be coupled to a network 1160 to communicate (e.g., send and/or receive) media information to and from network 1160. Content delivery device(s) 1140 also may be coupled to platform 1102 and/or to display 1120.

In various implementations, content services device(s) 1130 may include a cable television box, personal computer, network, telephone, Internet enabled devices or appliance capable of delivering digital information and/or content, and any other similar device capable of uni-directionally or bi-directionally communicating content between content providers and platform 1102 and/display 1120, via network 1160 or directly. It will be appreciated that the content may be communicated uni-directionally and/or bi-directionally to and from any one of the components in system 1100 and a content provider via network 1160. Examples of content may include any media information including, for example, video, music, medical and gaming information, and so forth.

Content services device(s) 1130 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 1102 may receive control signals from navigation controller 1150 having one or more navigation features. The navigation features of controller 1150 may be used to interact with user interface 1122, for example. In various embodiments, navigation controller 1150 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 1150 may be replicated on a display (e.g., display 1120) by movements of a pointer, cursor, focus ring, or other visual indicators displayed on the display. For example, under the control of software applications 1116, the navigation features located on navigation controller 1150 may be mapped to virtual navigation features displayed on user interface 1122, for example. In various embodiments, controller 1150 may not be a separate component but may be integrated into platform 1102 and/or display 1120. The present disclosure, however, is not limited to the elements or in the context shown or described herein.

In various implementations, drivers (not shown) may include technology to enable users to instantly turn on and off platform 1102 like a television with the touch of a button after initial boot-up, when enabled, for example. Program logic may allow platform 1102 to stream content to media adaptors or other content services device(s) 1130 or content delivery device(s) 1140 even when the platform is turned "off" In addition, chipset 1105 may include hardware and/or software support for 5.1 surround sound audio and/or high definition 7.1 surround sound audio, for example. Drivers may include a graphics driver for integrated graphics platforms. In various embodiments, the graphics driver may comprise a peripheral component interconnect (PCI) Express graphics card.

In various implementations, any one or more of the components shown in system 1100 may be integrated. For example, platform 1102 and content services device(s) 1130 may be integrated, or platform 1102 and content delivery device(s) 1140 may be integrated, or platform 1102, content services device(s) 1130, and content delivery device(s) 1140 may be integrated, for example. In various embodiments, platform 1102 and display 1120 may be an integrated unit. Display 1120 and content service device(s) 1130 may be integrated, or display 1120 and content delivery device(s) 1140 may be integrated, for example. These examples are not meant to limit the present disclosure.

In various embodiments, system 1100 may be implemented as a wireless system, a wired system, or a combination of both. When implemented as a wireless system, system 1100 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 1100 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 1102 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 11.

Figure 12:
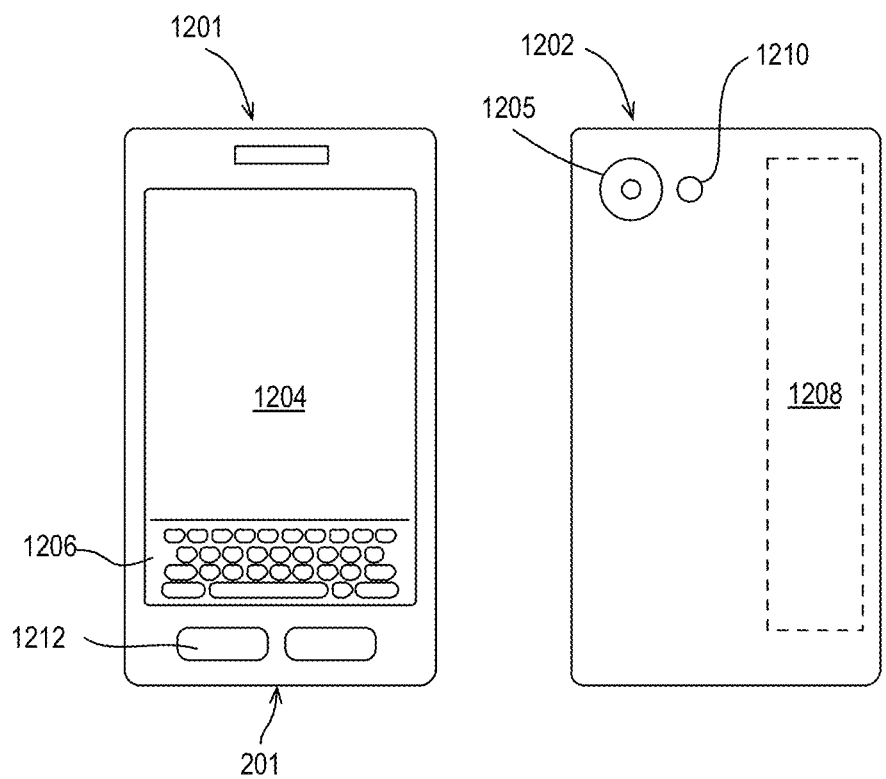
FIG. 12 illustrates an example device, all arranged in accordance with at least some implementations of the present disclosure.

As described above, system 1100 may be embodied in varying physical styles or form factors. FIG. 12 illustrates implementations of a small form factor device, arranged in accordance with at least some implementations of the present disclosure. In some examples, system 1100 may be implemented via device 1200. In other examples, other devices or systems, or portions thereof may be implemented via device 1200. In various embodiments, for example, device 1200 may be implemented as a mobile computing device a having wireless capabilities. A mobile computing device may refer to any device having a processing system and a mobile power source or supply, such as one or more batteries, for example.

Examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, smart device (e.g., smart phone, smart tablet or smart mobile television), mobile internet device (MID), messaging device, data communication device, cameras, and so forth.

Examples of a mobile computing device also may include computers that are arranged to be worn by a person, such as a wrist computers, finger computers, ring computers, eye-glass computers, belt-clip computers, arm-band computers, shoe computers, clothing computers, and other wearable computers. In various embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 12, device 1200 may include a housing with a front 1201 and a back 1202. Device 1200 includes a display 1204, an input/output (I/O) device 1206, and an integrated antenna 1208. Device 1200 also may include navigation features 1212. I/O device 1206 may include any suitable I/O device for entering information into a mobile computing device. Examples for I/O device 1206 may include an alphanumeric keyboard, a numeric keypad, a touch pad, input keys, buttons, switches, microphones, speakers, voice recognition device and software, and so forth. Information also may be entered into device 1200 by way of microphone 201, or may be digitized by a voice recognition device. As shown, device 1200 may include a camera 1205 (e.g., including a lens, an aperture, and an imaging sensor) and a flash 1210 integrated into back 1202 (or elsewhere) of device 1200.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

In one or more first embodiments, a computer-implemented method for key phrase detection comprises generating, via acoustic scoring of an acoustic model, a time series of scores of sub-phonetic units based on a time series of feature vectors representative of received audio input, updating a start state based rejection model and a key phrase model associated with a predetermined key phrase based on at least some of the time series of scores of sub-phonetic units to generate a rejection likelihood score and a key phrase likelihood score, and determining whether the received audio input is associated with the predetermined key phrase based on the rejection likelihood score and the key phrase likelihood score.

Further to the first embodiments, the start state based rejection model comprises self loops associated with at least some of the scores of sub-phonetic units of the acoustic model.

Further to the first embodiments, the start state based rejection model consists of a single state preceding the key phrase model.

Further to the first embodiments, the key phrase model comprises a multi-state lexicon look up key phrase model having transitions associated with the lexicon look up for the predetermined key phrase.

Further to the first embodiments, the key phrase model comprises a multi-state lexicon look up key phrase model having transitions associated with the lexicon look up for the predetermined key phrase and the key phrase likelihood score is associated with a final state of the multi-state lexicon look up key phrase model.

Further to the first embodiments, determining whether the received audio input is associated with the predetermined key phrase comprises determining a log likelihood score based on the rejection likelihood score and the key phrase likelihood score and comparing the log likelihood score to a threshold.

Further to the first embodiments, the acoustic model comprises a deep neural network and the time series of feature vectors comprises a first feature vector comprising a stack of a time series of coefficients each associated with a sampling time.

Further to the first embodiments, the method further comprises updating a second key phrase model associated with a second predetermined key phrase based on at least some of the time series of scores of sub-phonetic units to generate a second key phrase likelihood score and determining whether the received audio input is associated with the second predetermined key phrase based on the rejection likelihood score and the second key phrase likelihood score.

Further to the first embodiments, the method further comprises updating a second key phrase model associated with a second predetermined key phrase based on at least some of the time series of scores of sub-phonetic units to generate a second key phrase likelihood score and determining whether the received audio input is associated with the second predetermined key phrase based on the rejection likelihood score and the second key phrase likelihood score and the received audio input is associated with the second predetermined key phrase and the method further comprises providing a system command corresponding to the second predetermined key phrase.

In one or more second embodiments, a system for performing key phrase detection comprises a memory configured to store an acoustic model, a start state based rejection model, and a key phrase model associated with a predetermined key phrase and a digital signal processor coupled to the memory, the digital signal processor to generate, based on the acoustic model, a time series of scores of sub-phonetic units based on a time series of feature vectors representative of an audio input, to update the start state based rejection model and the key phrase model based on at least some of the time series of scores of sub-phonetic units to generate a rejection likelihood score and a key phrase likelihood score, and to determine whether the received audio input is associated with the predetermined key phrase based on the rejection likelihood score and the key phrase likelihood score.

Further to the second embodiments, the start state based rejection model comprises self loops associated with at least some of the scores of sub-phonetic units of the acoustic model.

Further to the second embodiments, the start state based rejection model consists of a single state preceding the key phrase model.

Further to the second embodiments, the key phrase model comprises a multi-state lexicon look up key phrase model having transitions associated with the lexicon look up for the predetermined key phrase and/or wherein the key phrase likelihood score is associated with a final state of the multi-state lexicon look up key phrase model.

Further to the second embodiments, the key phrase model comprises a multi-state lexicon look up key phrase model having transitions associated with the lexicon look up for the predetermined key phrase.

Further to the second embodiments, the key phrase model comprises a multi-state lexicon look up key phrase model having transitions associated with the lexicon look up for the predetermined key phrase and the key phrase likelihood score is associated with a final state of the multi-state lexicon look up key phrase model.

Further to the second embodiments, the digital signal processor is further to update a second key phrase model associated with a second predetermined key phrase based on at least some of the time series of scores of sub-phonetic units to generate a second key phrase likelihood score and determine whether the received audio input is associated with the second predetermined key phrase based on the rejection likelihood score and the second key phrase likelihood score.

Further to the second embodiments, the digital signal processor to determine whether the received audio input is associated with the predetermined key phrase comprises the digital signal processor to determine a log likelihood score based on the rejection likelihood score and the key phrase likelihood score and compare the log likelihood score to a threshold.

Further to the second embodiments, the acoustic model comprises a deep neural network and the time series of feature vectors comprises a first feature vector comprising a stack of a time series of coefficients each associated with a sampling time.

Further to the second embodiments, the digital signal processor is further to update a second key phrase model associated with a second predetermined key phrase based on at least some of the time series of scores of sub-phonetic units to generate a second key phrase likelihood score and determine whether the received audio input is associated with the second predetermined key phrase based on the rejection likelihood score and the second key phrase likelihood score.

Further to the second embodiments, the digital signal processor is further to update a second key phrase model associated with a second predetermined key phrase based on at least some of the time series of scores of sub-phonetic units to generate a second key phrase likelihood score and determine whether the received audio input is associated with the second predetermined key phrase based on the rejection likelihood score and the second key phrase likelihood score and the received audio input is associated with the second predetermined key phrase the digital signal processor is further to provide a system command corresponding to the second predetermined key phrase.

In one or more third embodiments, a computer-implemented method for generating a key phrase detection model including a start state based rejection model, a key phrase model, and a pruned acoustic model comprises training an acoustic model having a plurality of output nodes, the output nodes comprising a plurality of sub-phonetic units in the form of tied context-dependent triphone HMM-states, wherein each of the tied triphone HMM-states is associated with one of a plurality of monophones and generating a selected subset of the output nodes by determining a usage rate for each of the sub-phonetic units during the training, including, in the selected subset, at least one output node corresponding to a highest usage rate sub-phonetic unit for each of the plurality of monophones, and including, in the selected subset, output nodes corresponding to nodes of the key phrase model Further to the third embodiments, the method further comprises generating a pruned acoustic model having outputs consisting of the selected subset of the output nodes.

Further to the third embodiments, the plurality of output nodes of the acoustic model further comprise a plurality of non-speech nodes, and wherein the selected subset of the output nodes comprises the plurality of non-speech nodes.

Further to the third embodiments, determining the usage rate for each of the sub-phonetic units comprises incrementing a first usage rate associated with a first sub-phonetic unit when the first sub-phonetic unit has a non-zero output during the training of the acoustic model.

Further to the third embodiments, the start state based rejection model comprises a single state and self loops corresponding to the output nodes of the highest usage rate sub-phonetic unit for each of the plurality of monophones of the selected subset of the output nodes.

Further to the third embodiments, the key phrase model comprises a multi-node lexicon look up key phrase model.

In one or more fourth embodiments, a system for generating a key phrase detection model including a start state based rejection model, a key phrase model, and a pruned acoustic model comprises a memory configured to store an acoustic model and a processor coupled to the memory, the processor to train the acoustic model having a plurality of output nodes, the output nodes comprising a plurality of sub-phonetic units in the form of tied context-dependent triphone HMM-states, wherein each of the tied context-dependent triphone HMM-states is associated with one of a plurality of monophones and to generate a selected subset of the output nodes, wherein the processor to generate the selected subset comprises the processor to determine a usage rate for each of the sub-phonetic units during the training, to include, in the selected subset, at least one output node corresponding to a highest usage rate sub-phonetic unit for each of the plurality of monophones, and to include, in the selected subset, output nodes corresponding to nodes of the key phrase model.

Further to the fourth embodiments, the processor is further to generate a pruned acoustic model having outputs consisting of the selected subset of the output nodes.

Further to the fourth embodiments, the plurality of output nodes of the acoustic model further comprise a plurality of non-speech nodes, and wherein the selected subset of the output nodes comprises the plurality of non-speech nodes.

Further to the fourth embodiments, the processor to determine the usage rate for each of the sub-phonetic units comprises the processor to increment a first usage rate associated with a first sub-phonetic unit when the first sub-phonetic unit has a non-zero output during the training of the acoustic model.

Further to the fourth embodiments, the start state based rejection model comprises a single state and self loops corresponding to the output nodes of the highest usage rate sub-phonetic unit for each of the plurality of monophones of the selected subset of the output nodes.

Further to the fourth embodiments, the key phrase model comprises a multi-node lexicon look up key phrase model.

In one or more fifth embodiments, at least one machine readable medium may include a plurality of instructions that, in response to being executed on a computing device, cause the computing device to perform a method or any functions according to any one of the above embodiments.

In one or more sixth embodiments, an apparatus or a system may include means for performing a method or any functions according to any one of the above embodiments.

It will be recognized that the embodiments are not limited to the embodiments so described, but can be practiced with modification and alteration without departing from the scope of the appended claims. For example, the above embodiments may include specific combination of features. However, the above embodiments are not limited in this regard and, in various implementations, the above embodiments may include the undertaking only a subset of such features, undertaking a different order of such features, undertaking a different combination of such features, and/or undertaking additional features than those features explicitly listed. The scope of the embodiments should, therefore, be determined with reference to the appended claims, along with the full scope of equivalents to which such claims are entitled.

What is claimed is:

1. A computer-implemented method for key phrase detection comprising:
   generating, via acoustic scoring of an acoustic model, a time series of scores of sub-phonetic units based on a time series of feature vectors representative of received audio input;
   updating a start state based rejection model and a key phrase model associated with a predetermined key phrase based on at least some of the time series of scores of sub-phonetic units to generate a rejection likelihood score and a key phrase likelihood score, wherein the start state based rejection model consists of a single rejection state and comprises a plurality of rejection model self loops each associated with a particular score of the scores of sub-phonetic units of the acoustic model, wherein the key phrase model comprises a plurality of key phrase states interconnected by transitions therebetween, the plurality of key phrase states each comprising a self loop associated with a particular score of the scores of sub-phonetic units of the acoustic model, and wherein the start state based rejection model and the key phrase model are connected by a first transition from the single rejection state to a first key phrase state of the plurality of key phrase states; and
   determining whether the received audio input is associated with the predetermined key phrase based on the rejection likelihood score and the key phrase likelihood score.

2. The method of claim 1, wherein updating the start state based rejection model and the key phrase model comprises:
   providing a continual summing at the single rejection state of the start state based rejection model based on a previous score of the single rejection state and the particular scores corresponding to the plurality of rejection model self loops; and
   providing a continual summing at each key phrase state of the plurality of key phrase states based on a previous score of each key phrase state, the particular score corresponding to the self loop of each key phrase state, and a second score transitioned to each key phrase state from another state.

3. The method of claim 2, wherein updating the start state based rejection model and the key phrase model further comprises:
   comparing a sum of the previous score for a first key phrase state and a particular score corresponding to the self loop of the first key phrase state to a score for a second key phrase state interconnected to the first key phrase state by a first transition; and
   updating the score for the second key phrase state to the sum when the sum is greater than the score for the second key phrase state.

4. The method of claim 1, wherein the key phrase model comprises a multi-state lexicon look up key phrase model and the transitions of the key phrase model are associated with the lexicon look up for the predetermined key phrase.

5. The method of claim 4, wherein the key phrase likelihood score is associated with a final state of the multi-state lexicon look up key phrase model.

6. The method of claim 1, wherein determining whether the received audio input is associated with the predetermined key phrase comprises:
   determining a log likelihood score based on the rejection likelihood score and the key phrase likelihood score; and
   comparing the log likelihood score to a threshold.

7. The method of claim 1, wherein the acoustic model comprises a deep neural network and the time series of feature vectors comprises a first feature vector comprising a stack of a time series of coefficients each associated with a sampling time.

8. The method of claim 1, further comprising:
   updating a second key phrase model associated with a second predetermined key phrase based on at least some of the time series of scores of sub-phonetic units to generate a second key phrase likelihood score; and
   determining whether the received audio input is associated with the second predetermined key phrase based on the rejection likelihood score and the second key phrase likelihood score.

9. The method of claim 8, wherein the received audio input is associated with the second predetermined key phrase, the method further comprising:

providing a system command corresponding to the second predetermined key phrase.

10. A system for performing key phrase detection comprising:
a memory configured to store an acoustic model, a start state based rejection model, and a key phrase model associated with a predetermined key phrase; and
a digital signal processor coupled to the memory, the digital signal processor to generate, based on the acoustic model, a time series of scores of sub-phonetic units based on a time series of feature vectors representative of an audio input, to update the start state based rejection model and the key phrase model based on at least some of the time series of scores of sub-phonetic units to generate a rejection likelihood score and a key phrase likelihood score, wherein the start state based rejection model consists of a single rejection state and comprises a plurality of rejection model self loops each associated with a particular score of the scores of sub-phonetic units of the acoustic model, wherein the key phrase model comprises a plurality of key phrase states interconnected by transitions therebetween, the plurality of key phrase states each comprising a self loop associated with a particular score of the scores of sub-phonetic units of the acoustic model, and wherein the start state based rejection model and the key phrase model are connected by a first transition from the single rejection state to a first key phrase state of the plurality of key phrase states, and to determine whether the received audio input is associated with the predetermined key phrase based on the rejection likelihood score and the key phrase likelihood score.

11. The system of claim 10, wherein the digital signal processor to update the start state based rejection model and the key phrase model comprises the digital signal processor to provide a continual summing at the single rejection state of the start state based rejection model based on a previous score of the single rejection state and the particular scores corresponding to the plurality of rejection model self loops and to provide a continual summing at each key phrase state of the plurality of key phrase states based on a previous score of each key phrase state, the particular score corresponding to the self loop of each key phrase state, and a second score transitioned to each key phrase state from another state.

12. The system of claim 10, wherein the digital signal processor to update the start state based rejection model and the key phrase model comprises the digital signal processor further to compare a sum of the previous score for a first key phrase state and a particular score corresponding to the self loop of the first key phrase state to a score for a second key phrase state interconnected to the first key phrase state by a first transition and to update the score for the second key phrase state to the sum when the sum is greater than the score for the second key phrase state.

13. The system of claim 10, wherein the key phrase model comprises a multi-state lexicon look up key phrase model and the transitions of the key phrase model are associated with the lexicon look up for the predetermined key phrase.

14. The system of claim 13, wherein the key phrase likelihood score is associated with a final state of the multi-state lexicon look up key phrase model.

15. The system of claim 10, wherein the digital signal processor to determine whether the received audio input is associated with the predetermined key phrase comprises the digital signal processor to determine a log likelihood score based on the rejection likelihood score and the key phrase likelihood score and compare the log likelihood score to a threshold.

16. The system of claim 10, wherein the acoustic model comprises a deep neural network and the time series of feature vectors comprises a first feature vector comprising a stack of a time series of coefficients each associated with a sampling time.

17. The system of claim 10, wherein the digital signal processor is further to update a second key phrase model associated with a second predetermined key phrase based on at least some of the time series of scores of sub-phonetic units to generate a second key phrase likelihood score and determine whether the received audio input is associated with the second predetermined key phrase based on the rejection likelihood score and the second key phrase likelihood score.

18. At least one non-transitory machine readable medium comprising a plurality of instructions that, in response to being executed on a device, cause the device to generate a key phrase detection model comprising a start state based rejection model, a key phrase model, and a pruned acoustic model by:
training an acoustic model having a plurality of output nodes, the output nodes comprising a plurality of sub-phonetic units in the form of tied context-dependent triphone HMM-states, wherein each of the tied context-dependent triphone HMM-states is associated with one of a plurality of monophones; and
generating a selected subset of the output nodes by:
determining a usage rate for each of the sub-phonetic units during the training;
including, in the selected subset, at least one output node corresponding to a highest usage rate sub-phonetic unit for each of the plurality of monophones;
including, in the selected subset, output nodes corresponding to states of the key phrase model; and
discarding remaining output nodes not in the selected subset; and
generating a pruned acoustic model having outputs comprising the selected subset of the output nodes, wherein the start state based rejection model comprises rejection model self loops associated with first outputs of the pruned acoustic model, the states of the key phrase model are associated with second outputs of the acoustic model, and wherein the start state based rejection model and the key phrase model are connected by a transition from a single rejection state of the start state based rejection model to a first state of the states of the key phrase model.

19. The non-transitory machine readable medium of claim 18, wherein generating the selected subset of the output nodes further comprises:
including, in the selected subset, each output node corresponding to a usage rate that is greater than a threshold.

20. The non-transitory machine readable medium of claim 18, wherein the plurality of output nodes of the acoustic model further comprise a plurality of non-speech nodes, and wherein the selected subset of the output nodes comprises the plurality of non-speech nodes.

21. The non-transitory machine readable medium of claim 18, wherein determining the usage rate for each of the sub-phonetic units comprises incrementing a first usage rate associated with a first sub-phonetic unit when the first sub-phonetic unit has a non-zero output during the training of the acoustic model.

22. The non-transitory machine readable medium of claim 18, wherein the start state based rejection model comprises the single rejection state and self loops corresponding to the output nodes of the highest usage rate sub-phonetic unit for each of the plurality of monophones of the selected subset of the output nodes.

23. The non-transitory machine readable medium of claim 18, wherein the key phrase model comprises a multi-node lexicon look up key phrase model.

* * * * *